United States Patent [19]

Finney

[11] Patent Number: 4,936,593
[45] Date of Patent: Jun. 26, 1990

[54] SHAFT SEAL

[76] Inventor: Philip F. Finney, 425 E. Washington, Villa Park, Ill. 60181

[21] Appl. No.: 229,467

[22] Filed: Aug. 8, 1988

[51] Int. Cl.$^5$ ................................................. F16J 3/02
[52] U.S. Cl. ......................................... 277/88; 277/12; 440/83; 440/112
[58] Field of Search ...................... 74/18.2; 440/65, 83, 490/112; 277/1, 3, 5, 12, 81 R, 88, 89, 212 FB, 96, 96.2, 91, 92, 93 R, 93 SD, 71, 75

[56] References Cited

U.S. PATENT DOCUMENTS

| | | | |
|---|---|---|---|
| 2,122,378 | 6/1938 | McCormack | 277/88 |
| 3,081,099 | 3/1963 | Walker et al. | 277/88 |
| 3,526,408 | 9/1970 | Tracy | 277/88 |
| 3,822,066 | 7/1974 | Keys | 277/88 R |
| 4,095,807 | 6/1978 | Jardt et al. | 277/88 |
| 4,293,304 | 10/1981 | Sandström et al. | 440/83 |
| 4,648,605 | 3/1987 | Marsi | 277/88 |
| 4,732,396 | 3/1988 | Bringham et al. | 277/3 |

FOREIGN PATENT DOCUMENTS 1269852 6/1968 Fed. Rep. of Germany ........ 277/88
508776 7/1939 United Kingdom ................... 277/88

Primary Examiner—Allan N. Shoap
Assistant Examiner—Jeffrey J. Hohenshell
Attorney, Agent, or Firm—Edmond T. Patnaude

[57] ABSTRACT

A seal assembly for providing a seal between the hull of a powered water craft and a drive shaft which passes through the hull includes a flexible tubular boot which is attached to a through-hull fitting which is affixed to the hull and is attached at its other end via a leak-proof seal to the shaft at a location within the hull. The shaft seal assembly includes a pair of mutually engaging annular face seal members with one of the seal members being affixed to the fitting and the other being affixed to a sealing collar which is adjustably positioned along the shaft.

10 Claims, 1 Drawing Sheet

SHAFT SEAL

The present invention relates in general to seals for rotating shafts, and it relates in particular to a new and improved seal for an axially movable, rotatable shaft of the type which extends through the hull of a boat or the like.

BACKGROUND OF THE INVENTION Powered watercraft commonly have the engine and transmission mounted within the hull by means of resilient mountings in order to minimize noise levels and to isolate the inherent vibration of the engine. In most small watercraft the forward and reverse thrust generated by the propeller is transmitted through the shaft to the propulsion machinery and then through the resilient mounts to the hull.

It is the common practice in powered watercraft construction to provide a seal between the shaft and the hull to prevent water from flowing along the shaft into the hull. Inasmuch as the shaft rotates in either of two directions and moves axially in the forward or reverse direction when the thrust is reversed, the shaft seal must function efficiently under this quadridirectional movement of the shaft relative to the hull.

Shaft seals are also used in connection with rudder shafts, thrusters, stabilizers and the like to prevent leakage of water into the hull of the associated vessel.

In the past the most commonly used seal was an annular compression gland held under compression in a cavity of a body surrounding the shaft and mounted to the hull. The sealant material most commonly used has been hemp or cotton cordage impregnated with a lubricant. Such seals have been unreliable.

Shaft seals have been designed for other applications, but they are unsuitable for use with motorcraft and, therefore, have not found use therewith. For example, U.S. Pat. No. 4,095,808 discloses a shaft seal which permits for a very limited amount of axial movement of the shaft, much less than the one-half inch or more which is commonplace in powered watercraft. Also, that prior art shaft seal requires precise alignment of the shaft and the impeller relative to the housing, which would be the hull fitting if the seal were used in watercraft. Similar seals are disclosed in U.S. Pat. Nos. 4,363,491 and 4,732,396 where the seal assembly is maintained in fixed relationship with the housing.

SUMMARY OF THE INVENTION

Briefly, in accordance with the present invention there is provided a shaft seal assembly which is fixedly mounted to the shaft and connected to the through-hull fitting by a flexible, tubular boot. Irrespective of axial and eccentric movement of the shaft at the location of the seal, a leak-proof seal is provided and the undesirable accumulation of water in the bilge and machinery spaces of watercraft is eliminated.

The shaft seal assembly includes a pair of annular face seal members which are respectively sealed to the through-hull fitting and to the shaft and held in mutual compression by a coil spring adjustably positioned along the shaft.

GENERAL DESCRIPTION OF THE DRAWING

The present invention will be better understood by a reading of the following detailed description taken in connection with the accompanying drawing wherein.

DETAILED DESCRIPTION OF A PREFERRED EMBODIMENT OF THE INVENTION

Figure 1:
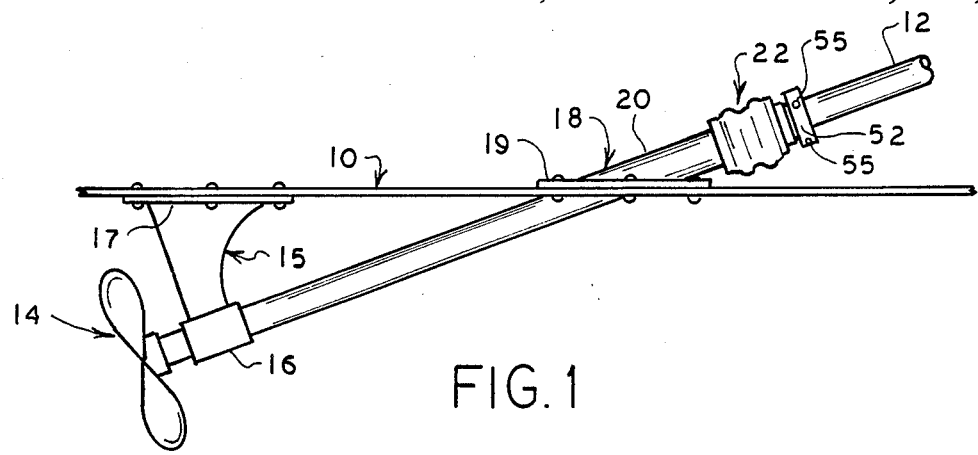
FIG. 1 is a partially sectioned elevational view showing the use of a seal embodying the present invention.

Referring particularly to FIG. 1, a section of the hull of a boat or the like is shown in cross-section and identified by the number 10. A drive shaft 12 extends from suitable propulsion machinery such as an engine and transmission (not shown) located within the hull to a propeller 14 mounted to one end of the shaft. The lower end portion of the shaft 12 is journaled in a conventional shaft mount 15 mounted to the bottom of the hull 10. The fitting 15 includes a tubular bearing portion 16 in which the shaft is journaled and a mounting flange 17 which is suitably attached by means of nut and bolt assemblies to the bottom surface of the hull 10. A through-hull fitting 18 is located within the hull 10 and is suitably secured thereto over a hole through the hull as by means of nut and bolt assemblies. As shown, the through-hull rigid fitting 18 includes an annular mounting flange 19 and a tubular section 20 through which the drive shaft 10 loosely extends. The tubular section 20 is axially aligned with the bearing portion 16 of the fitting 15. Mounted over the end of the tubular section 20 is a shaft seal assembly 22, which as fully described hereinafter, is sealably connected at its lower end to the tubular section 20 and is sealably connected at its upper end to the shaft 12.

Figure 2:
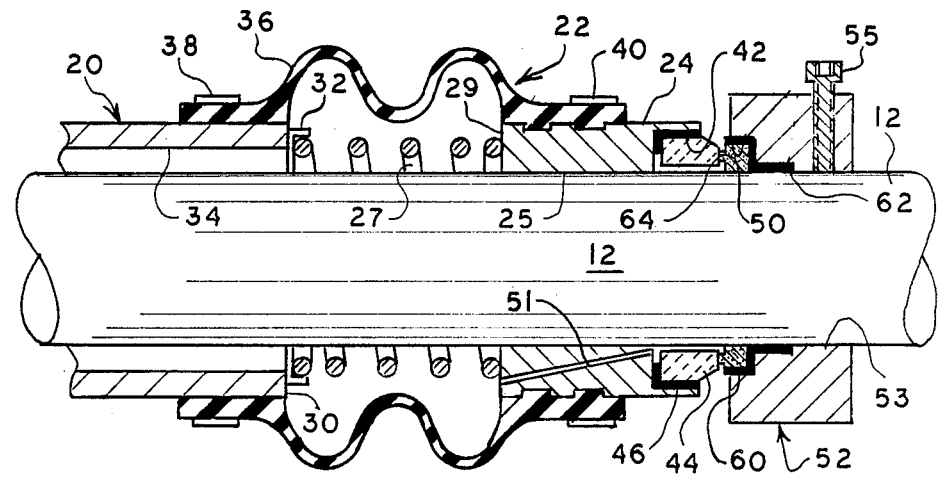
FIG. 2 is a longitudinally sectioned view of a seal assembly embodying the present invention.

Referring more particularly to FIG. 2, it will be seen that the shaft seal assembly 22 includes a sleeve bearing 24, preferably formed of bronze, having a cylindrical bore 25 in which the shaft 12 is journaled. A coil spring 27 surrounds the shaft 12 and is compressed between one end face 29 of the sleeve 24 and the distal end 30 of the tubular section 20 of the through-hull fitting 18. An annular guide member 32 is loosely disposed over the end of the spring 27 and is interposed between the end 30 and the spring 27 to prevent movement of the spring 27 into the relatively large annular space between the shaft 12 and the bore 34 of the through-hull fitting 18.

A flexible and axially expandable, elastomeric hose or boot 36 is fitted at one end over the distal end portion of the section 20 and is sealably and securely affixed thereto by a suitable clamp 38. The other end of the boot 36 is similarly secured and sealed over the sleeve bearing 24 by a suitable clamp 40. An annular recess or counterbore 42 is provided in one end of the sleeve bearing 24 opposite the boot 36, and a tubular sealing member 44 is sealably and fixedly mounted in the counterbore 42 by a layer of suitable cement 46. If desired a molded annular gasket formed of a suitable elastomeric material may be used to seal the sealing member 44 to the sleeve 24. Preferably, the sealing member 44 is a molded ceramic part having a planar annular face 50 machined thereon. The plane of the face 50 is perpendicular to the central longitudinal axis of the sleeve bearing 24. The sealing member may be made of other materials such as stainless steel or bronze.

A drain hole 51 extends through the sleeve 24 from the counterbore 42 on the lower side of the sleeve to allow any entrapped water to drain from the seal cavity during cold weather out-of-water storage to prevent seal damage.

In order to install the seal assembly 22, the spring 27 and the end piece 32 are slipped over the shaft 12 and the pre-assembled boot and sleeve bearing 24 are then slipped over the shaft with the boot extending over the spring 27. The pre-assembled boot and sleeve bearing is rotated to place the drain hole at its lowest point in relation to shaft 12. The boot is then clamped over the end of the tubular portion 20 of the through-hull fitting 18 using the clamp 38. The collar 52 is then slipped over the shaft and pressed toward the hull fitting to compress and preload the spring 27 by an amount no less than one-half of the possible axial movement of the shaft during operation of the vessel. The set screws 55 are then tightened to lock the collar 52 in place.

It may be seen that during use of the vessel water will enter the space in the boot 22 via the annular space between the shaft 12 and the through-hull fitting 18. Some of this water leaks through the annular space between the shaft 12 and the bore 25 and acts as a lubricant for the bearing. Inasmuch as the ring members 44 and 60 are respectively sealed to the sleeve 24 and the collar 52 and are sealed to one another there is no leakage of water into the hull 10. Any axial movement of the shaft toward the left as viewed in FIG. 2 causes the spring 27 and the boot 36 to compress while maintaining the seal intact. Axial movement of the shaft toward the right permits the spring 27 and the boot 36 to expand, and as long as the spring 27 is partially compressed the faces 50 and 64 are held in mutual sealing abutment. Also, since the sleeve bushing 24 and the collar 52 are fitted to the shaft in proximity to one another any wobble or eccentric motion of the shaft does not result in relative movement between the bushing 24 and the collar 52 and does not, therefore, affect the seal.

Figure 3:
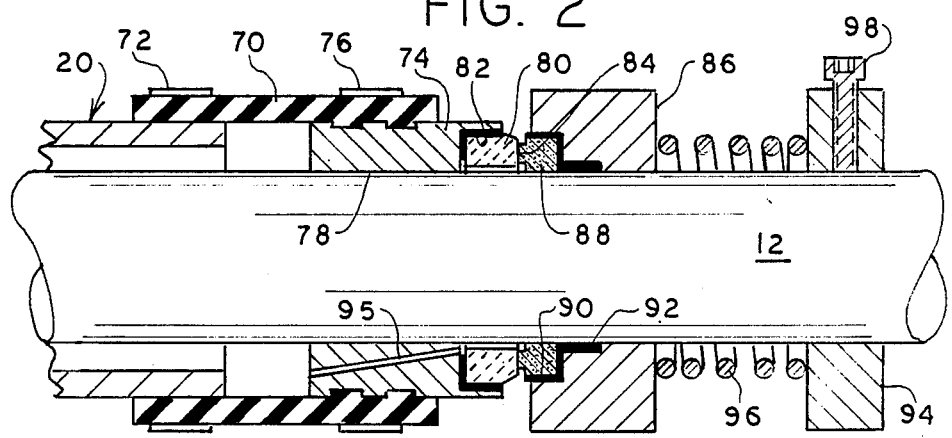
FIG. 3 is a longitudinally sectioned view of an alternative embodiment.

Referring to FIG. 3 there is shown an alternative embodiment of the invention which may be used where axial motion of the shaft 12 is minimal but substantial wobble or eccentricity is present. As shown, a flexible tubular member or hose 70 is sealably affixed at one of its ends over the distal end of the tubular portion 20 of the through-hull fitting 18. A hose clamp 72 is used to secure the hose 70 to the fitting 18. The other end of the hose 70 is sealably affixed to a sleeve bushing 74 which may be identical in construction to the sleeve bushing 24. A hose clamp 76 is used to affix the hose 70 to the bushing 74.

The sleeve bushings 74 is preferably formed of bronze and is provided with a bore 78 in which the shaft 12 is journaled. An annular sealing member 80 is sealably and fixedly mounted in a counterbore 82 in one end of the sleeve 74 and is provided with a planar face 84 lying perpendicular to the central longitudinal axis of the sleeve 74. A collar 86 is slidably fitted on the shaft 12, and a sealing ring 88 is sealably and fixedly mounted in a counterbore 90 at one end of the collar 86. A second counterbore 92 is provided in the collar 86 to receive an annular sealing gasket which provides an axially slidable seal between the collar 86 and the shaft 12. A second collar 94 is slidably fitted on the shaft 12, and a coil spring 96 is compressed between the collars 86 and 94. As shown, a drain hole 95 corresponding to the drain hole shown in FIG. 2 is provided in the sleeve 74.

In use, the assembly is first attached to the through-hull fitting over the shaft and the collar 94 is then positioned adjustably along the shaft 12 to apply a preload to the spring 96. One or more set screws 98 are then tightened to lock the collar 94 in place and to maintain the spring 96 in the partially compressed, pre-loaded state.

In this alternative embodiment, axial movement of the shaft 12 causes the spring 96 to expand or contract while maintaining the seal faces on the member 80 and on the ring 88 in mutual sealing abutment, and a sliding seal is maintained between the collar 86 and the shaft 12 by the elastomeric sealing gasket within the counterbore 92.

In the embodiments of the invention described hereinabove it is preferable to machine the faces of the sealing members 44 and 80 on a ceramic molding because of the several advantages including the high degree of precision with which the sealing surfaces may be machined, the dimensional stability of the flat sealing face over a wide temperature range, the good wear resistance of the sealing members, high compressive strength and the use of water as a natural lubricant Preferably the parts 60 and 88 are formed of carbon, which is compatible with ceramic, which can be machined with a high degree of flatness, and which has a surface finish which remains stable over a wide temperature range. Also, carbon has good compressive strength and water is a natural lubricant for carbon.

While the present invention has been described in connection with particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A seal assembly for use with a rotatable shaft extending through the hull of a vessel between drive apparatus mounted within the vessel and its associated mechanism located outside of the vessel, comprising in combination a hull fitting sealably affixed to said hull and including a tubular portion having a distal end disposed within said vessel, said shaft extending through said tubular portion of said hull fitting, a sleeve bearing through which said shaft extends, a coil spring surrounding said shaft and held in compression between said sleeve bearing and said distal end of said tubular portion of said hull fitting, a tubular resilient imperforate member sealably affixed at one end to said tubular portion and sealably affixed at the other end to said sleeve bearing, said tubular resilient imperforate member enclosing said spring, a collar slidably disposed on said shaft, locking means for locking said collar at a fixed position along said shaft, a first annular seal member carried by said sleeve bearing and sealed to said sleeve bearing throughout a continuous area surrounding said shaft, a second annular seal member carried by said collar and sealed to said collar throughout a continuous area surrounding said shaft, and first and second mutually abutting sealing faces respectively provided on said first and second annular seal members.

2. A seal assembly according to claim 1, wherein said tubular resilient member comprises an elastomeric, corrugated tube.

3. A seal assembly according to claim 1, comprising clamp means securing said tubular resilient member to said tubular portion of said hull fitting.

4. A seal assembly according to claim 1 comprising a hole through said sleeve extending from a location on said sleeve adjacent said first annular seal member to the opposite end of said annular sleeve.

5. A seal assembly for use with a rotatable shaft extending through the hull of a vessel between drive apparatus mounted within said vessel and its associate machinery located outside of said vessel, comprising in combination
  a hull fitting sealably affixed to said hull and including a tubular portion having a distal end located within said vessel,
  said shaft extending through said tubular portion,
  a sleeve bearing through which said shaft extends,
  a tubular resilient imperforate member sealably affixed at one end over said distal end of said tubular portion and sealably affixed at the other end over said sleeve bearing,
  an annular collar slidable along said shaft and having a first annular sealing member sealed thereto,
  a second annular sealing member sealably affixed to said sleeve bearing,
  first and second mutually engaging annular sealing faces respectively provided on said first and second annular sealing members, and
  coil spring means biasing said first and second members toward one another to maintain said first and second annular sealing faces in mutual engagement.

6. A seal assembly according to claim 5 wherein said tubular resilient member is a corrugated tube.

7. A seal assembly according to claim 5 wherein one of said sealing members is formed of ceramic.

8. A seal assembly according to claim 7 wherein the other of said sealing members is formed of carbon.

9. A seal assembly according to claim 5 comprising a hole through said sleeve extending from a location on said sleeve adjacent said first annular seal member to the opposite end of said annular sleeve.

10. A seal assembly for use with a rotatable shaft extending through the hull of a vessel between drive apparatus mounted within said vessel and its associate machinery located outside of said vessel, comprising in combination
  a hull fitting sealably affixed to said hull and including a tubular portion having a distal end located within said vessel,
  said shaft extending through said tubular portion,
  a sleeve bearing through which said shaft extends,
  a tubular resilient imperforate member sealably affixed at one end over said distal end of said tubular portion and sealably affixed at the other end over said sleeve bearing, said tubular resilient imperforate member biasing a first annular sealing member toward a second annular sealing member, said first annular sealing member sealingly engaging
  an annular collar slidable along said shaft,
  said second annular sealing member sealably affixed to said sleeve bearing, and
  first and second mutually engaging annular sealing faces respectively provided on said first and second annular sealing member.

* * * * *